(12) United States Patent
Armstrong et al.

(10) Patent No.: US 9,723,620 B2
(45) Date of Patent: Aug. 1, 2017

(54) POWER-AWARE COEXISTENCE

(75) Inventors: Dean Armstrong, Hamilton (NZ); Thomas Christopher Grocutt, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 401 days.

(21) Appl. No.: 13/528,737

(22) Filed: Jun. 20, 2012

(65) Prior Publication Data

US 2013/0344821 A1   Dec. 26, 2013

(51) Int. Cl.
*H04B 1/44* (2006.01)
*H04W 72/12* (2009.01)

(52) U.S. Cl.
CPC .............................. *H04W 72/1215* (2013.01)

(58) Field of Classification Search
USPC ........... 455/78, 79, 552.1, 67.11, 553.1, 41.2
See application file for complete search history.

(56) References Cited

U.S. PATENT DOCUMENTS

| | | | |
|---|---|---|---|
| 5,918,176 A * | 6/1999 | Arrington et al. | 455/430 |
| 6,873,601 B1 * | 3/2005 | Chow et al. | 370/254 |
| 8,520,586 B1 * | 8/2013 | Husted et al. | 370/318 |
| 8,774,722 B2 * | 7/2014 | Hsu et al. | 455/63.1 |
| 2005/0030976 A1 * | 2/2005 | Wentink | H04B 7/2126 |
| | | | 370/473 |
| 2005/0122912 A1 * | 6/2005 | Jeon | H04L 1/0003 |
| | | | 370/252 |

(Continued)

FOREIGN PATENT DOCUMENTS

EP   1835627   9/2007

OTHER PUBLICATIONS

IEEE Standard 802.15.2—IEEE Recommended Practice for Information Technology—Telecommunications and Information Exchange Between Systems—Local and Metropolitan Area Networks—Specific Requirements, Aug. 28, 2003, pp. 1-126.

(Continued)

*Primary Examiner* — Nay A Maung
*Assistant Examiner* — Erica Fleming-Hall
(74) *Attorney, Agent, or Firm* — Procopio, Cory, Hargreaves & Savitch LLP

(57) ABSTRACT

A communication device comprising: a receiver operable to receive radio transmissions according to a first communication protocol; a transmitter operable to transmit radio transmissions according to a second communication protocol; and an arbiter connected to the receiver and transmitter; wherein the arbiter is configured to: receive from the transmitter an indication of a first transmit operation intended for performance during a first time period and one or more intended transmit characteristics of the first transmit operation, including a representation of the intended transmit power; determine whether the receiver intends to perform a communication operation during the first time period; determine in dependence on the transmit characteristics and the receive quality, a set of one or more threshold transmit characteristics for the first transmit operation; and cause the transmitter to proceed with the first transmit operation only if its transmit characteristics are constrained in accordance with the threshold transmit characteristics.

34 Claims, 1 Drawing Sheet

(56) References Cited

U.S. PATENT DOCUMENTS

| | | | |
|---|---|---|---|
| 2005/0128970 A1* | 6/2005 | Tsien | H04W 52/243 370/315 |
| 2006/0120338 A1* | 6/2006 | Hwang | H04W 52/24 370/338 |
| 2007/0021060 A1* | 1/2007 | Karabinis et al. | 455/12.1 |
| 2009/0003294 A1* | 1/2009 | Zhu et al. | 370/338 |
| 2010/0008312 A1* | 1/2010 | Viswanath | H04W 72/042 370/329 |
| 2010/0202416 A1* | 8/2010 | Wilhelmsson | H04W 72/1215 370/336 |
| 2011/0009060 A1* | 1/2011 | Hsu et al. | 455/41.2 |
| 2011/0081858 A1* | 4/2011 | Tolentino et al. | 455/41.2 |
| 2011/0167291 A1* | 7/2011 | Liu | H04W 52/20 713/340 |
| 2011/0300805 A1* | 12/2011 | Gaikwad et al. | 455/63.1 |
| 2011/0312288 A1* | 12/2011 | Fu et al. | 455/88 |
| 2012/0071106 A1* | 3/2012 | Kadous et al. | 455/67.11 |
| 2012/0163352 A1* | 6/2012 | Bansal et al. | 370/338 |
| 2012/0207032 A1 | 8/2012 | Chen et al. | |
| 2013/0070823 A1* | 3/2013 | Malkin et al. | 375/220 |
| 2013/0182589 A1* | 7/2013 | Tolentino et al. | 370/252 |
| 2013/0203457 A1* | 8/2013 | Zhang | 455/522 |
| 2013/0295989 A1* | 11/2013 | Smadi et al. | 455/553.1 |
| 2013/0303215 A1* | 11/2013 | Piipponen et al. | 455/501 |
| 2014/0098681 A1* | 4/2014 | Stager | H04W 24/02 370/252 |
| 2014/0187249 A1* | 7/2014 | Fu et al. | 455/443 |
| 2014/0314033 A1* | 10/2014 | Ohwatari | H04W 48/20 370/329 |
| 2015/0319700 A1* | 11/2015 | Oteri | H04W 52/10 455/127.1 |

OTHER PUBLICATIONS

Search Report issued Nov. 22, 2013 in corresponding GB1300466.8.

* cited by examiner

POWER-AWARE COEXISTENCE

BACKGROUND OF THE INVENTION

This invention relates to a communication device and method for arbitrating between the communication operations of collocated transceivers capable of causing mutual interference.

Many modern communication devices such as smartphones allow communications by means of multiple radio protocols operating over common or adjacent frequency bands. For example, smartphones typically include Bluetooth and WiFi transceivers that both operate in the 2.4-2.5 GHz ISM frequency band. This can lead to interference problems between the radio protocols and a degradation in performance.

In order to mitigate the mutual interference experienced by wireless transceivers operating in close spectral and physical proximity, arbitration schemes are normally necessary to control the timing and/or frequency of transmissions by the collocated transceivers. Conventional arbitration schemes typically involve scheduling the transmissions of a first transceiver around the communications of a second collocated transceiver, such that the first transceiver does not transmit when the second transceiver is (or could be) communicating. Typically, communications of the second transceiver would be of higher priority or of a communication protocol that operates according to fixed known time slots (e.g. Bluetooth).

Some arbitration schemes, such as the packet traffic arbitration schemes described in IEEE 802.15.2-2003, involve per-packet or per-communication burst arbitration between transceivers at the data link layer. Typically, such arbitration involves identification of temporally or spectrally-overlapping communication activities and deferral or cancellation of those communication activities that are identified as being of lower priority. The priority could be an indicated priority level of the communication activities or a priority level determined at the arbitrator according to some predetermined algorithm. However, whilst such link layer arbitration schemes are effective at avoiding interference at the physical layer, they do not address the significant problem of poor link or transport layer reaction to the variable nature of services provided beneath them.

There is therefore a need for an improved arbitration scheme that addresses these problems.

SUMMARY OF THE INVENTION

According to a first aspect of the present invention there is provided a communication device comprising: a receiver operable to receive radio transmissions according to a first communication protocol; a transmitter operable to transmit radio transmissions according to a second communication protocol; and an arbiter connected to the receiver and transmitter; wherein radio transmissions from the transmitter are capable of interfering with the reception of radio transmissions by the receiver, and the arbiter is configured to: receive from the transmitter an indication of a first transmit operation intended for performance during a first time period and one or more intended transmit characteristics of the first transmit operation, including a representation of the intended transmit power; determine whether the receiver intends to perform a communication operation during the first time period; if the receiver intends to perform a first receive operation having one or more intended receive characteristics during the first time period, accessing an indication of receive quality determined by the receiver; determine in dependence on the transmit characteristics and the receive quality, a set of one or more threshold transmit characteristics for the first transmit operation, the threshold transmit characteristics including a representation of a maximum transmit power at which the transmitter is permitted to perform the first transmit operation; and cause the transmitter to proceed with the first transmit operation only if its transmit characteristics are constrained in accordance with the threshold transmit characteristics.

Suitably the intended transmit characteristics include an indication of one or more of the channel, frequency range, modulation scheme, and selection of one or more first antennas intended for the first transmit operation.

Suitably the indication of receive quality is one or more of received signal strength, received power, a measure of noise level, a measure of error rate, and a number of packets dropped.

Preferably the indication of receive quality represents a measure of the receive quality of one or more previous reception operations. Preferably the receive quality is an average of a predetermined number of previous reception operations. Suitably the one or more previous reception operations are reception operations performed over one or more of the same channel, frequency range, modulation scheme, and selection of one or more second antennas as intended for the first receive operation.

Suitably the first time period includes a single data packet, a burst of data packets, or a predetermined length of time.

Preferably the receiver is configured to notify the arbiter of the first receive operation by writing a receive indicator to a memory along with an indication of receive quality at the receiver, the arbiter being configured to access the memory in order to determine whether the receiver intends to perform a receive operation during the first time period and to receive from the receiver an indication of receive quality at the receiver.

Preferably the receiver is configured to notify the arbiter of the first receive operation by sending a receive indicator to the arbiter, the receive indicator comprising an indication of receive quality at the receiver. Preferably the receive indicator includes the intended receive characteristics of the first receive operation.

Preferably the intended transmit characteristics comprise an indication of the intended transmit channel and the intended receive characteristics comprise an indication of the intended receive channel, and the arbiter is configured to determine the threshold transmit characteristics in dependence on the intended transmit and/or receive channels. Preferably the arbiter is configured to determine the threshold transmit characteristics in dependence on a measure of the relative or absolute separation of the intended receive and transmit channel frequencies.

Preferably the arbiter is configured to determine the threshold transmit characteristics in dependence on threshold data held at a data store. Preferably the arbiter is configured to dynamically update the threshold data in dependence on the receive quality of receive operations performed by the receiver. Preferably at least some of the threshold data is determined from empirical measurements or computational modeling of receive quality at the receiver for transmit operations performed by the transmitter having a range of transmit characteristics. Preferably the threshold data includes one or more threshold algorithms and the arbiter is configured to determine the threshold transmit characteristics by performing the threshold algorithms. Suitably the threshold algorithms include one or more mathematical equations describing the variation of receive quality with transmit power and optionally frequency.

Preferably the transmitter is configured to send the indication of a first transmit operation to the arbiter as a transmit request comprising the intended transmit characteristics. Preferably the arbiter is configured to infer the first time period from the timing of the transmit request. Alternatively the transmit request comprises information identifying the first time period.

Preferably the arbiter is configured to cause the transmitter to proceed with the first transmit operation by sending to the transmitter a transmit response comprising the threshold transmit characteristics.

Preferably the transmitter is further configured to receive an indication of the link margin at a remote receiver to which the transmitter has established a communication link over which the first transmit operation is to be transmitted. Preferably the link margin is representative of the reception quality of previous transmit operations by the transmitter over the communication link.

Preferably the transmitter is configured to determine whether to perform the first transmit operation in dependence on the threshold transmit characteristics and the link margin. Preferably the transmitter is configured to not perform the first transmit operation if the link margin is below a predetermined level and the maximum transmit power at which the transmitter is permitted to perform the first transmit operation is lower than the intended transmit power.

Suitably the transmitter is configured to include the indication of the link margin in the intended transmit characteristics and the arbiter is configured to determine whether to perform the first transmit operation by: estimating the link margin at the remote receiver if the first transmit operation were performed in accordance with the threshold transmit characteristics; and causing the transmitter to not perform the first transmit operation if the estimated link margin is below a predetermined level.

Suitably the transmitter is operable to transmit by means of two or more antennas and the threshold transmit characteristics include an indication of one or more of:

the maximum transmit power permitted from each of the antennas;

an indication of which of the antennas are permitted to be used;

an indication of a beam direction; and a modulation scheme in accordance with which the first transmit operation is to be performed.

Suitably the receiver is a transceiver and if, on determining whether the receiver intends to perform any communication operations during the first time period, the arbiter determines that the transceiver intends to transmit during the first time period, the arbiter is configured to cause the transmitter to not perform the first transmit operation.

Suitably the communication device comprises first and second radio transceivers either of which are operable as the recited transmitter.

Preferably the transmitter and receiver are provided at a common integrated circuit die.

Preferably the arbiter is provided at the common integrated circuit die.

Preferably the arbiter operates at the physical layer. Alternatively the arbiter comprises software executing at a processor of the communication device and operates at the data link layer.

Suitably the first and/or second communication protocols are Bluetooth or an IEEE 802.11 protocol.

According to a second aspect of the present invention there is provided a method for managing radio transmissions from a transmitter capable of causing interference at a collocated radio receiver, the transmitter and receiver being connected to an arbiter and the method comprising: the transmitter indicating to the arbiter a first transmit operation intended for performance during a first time period and making available to the arbiter one or more intended transmit characteristics of the first transmit operation, including a representation of the intended transmit power; the arbiter: determining whether the receiver intends to perform a communication operation during the first time period; if the receiver intends to perform a first receive operation having one or more intended receive characteristics during the first time period, accessing an indication of receive quality determined by the receiver; determining in dependence on the transmit characteristics and the receive quality, a set of one or more threshold transmit characteristics for the first transmit operation, the threshold transmit characteristics including a representation of a maximum transmit power at which the transmitter is permitted to perform the first transmit operation; and causing the transmitter to proceed with the first transmit operation only if its transmit characteristics are constrained in accordance with the threshold transmit characteristics.

According to a third aspect of the present invention there is provided an integrated circuit comprising: a receiver for receiving according to a first radio communication protocol; a transmitter for transmitting according to a second radio communication protocol; and an arbiter connected to the receiver and transmitter; wherein radio communications according to the first radio communication protocol are capable of interfering with communications according to the second radio communication protocol, and the arbiter is configured to: receive from the transmitter an indication of a first transmit operation intended for performance during a first time period and one or more intended transmit characteristics of the first transmit operation, including a representation of the intended transmit power; determine whether the receiver intends to perform a communication operation during the first time period; if the receiver intends to perform a first receive operation having one or more intended receive characteristics during the first time period, accessing an indication of receive quality determined by the receiver; determine in dependence on the transmit characteristics and the receive quality, a set of one or more threshold transmit characteristics for the first transmit operation, the threshold transmit characteristics including a representation of a maximum transmit power at which the transmitter is permitted to perform the first transmit operation; and cause the transmitter to proceed with the first transmit operation only if its transmit characteristics are constrained in accordance with the threshold transmit characteristics.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to an improved arbitration scheme for mitigating the effects of interference between two or more transceivers and allows per-packet arbitration according to a scheme in which the operation of a plurality of communication systems is not mutually exclusive.

Figure 1:
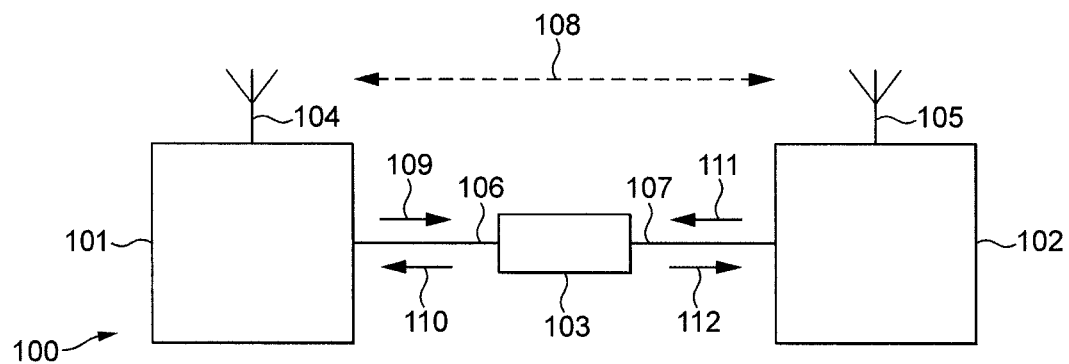
FIG. 1 is a schematic diagram of a pair of collocated transceivers configured in accordance with the present invention.

FIG. 1 shows a device 100 having a pair of collocated transceivers 101 and 102 whose transmissions are capable of interfering with one another. The potential mutual interference between the transceivers is indicated by dashed arrow 108 between the antennas 104 and 105 of the respective transceivers. The detrimental effect of the mutual interference on the performance of the transceivers is mitigated by arbiter 103, which manages transmissions by transceivers 101 and 102. Transceivers 101 and 102 could be provided at the same integrated circuit die or at separate dies.

Arbiter logic 103 could be provided in hardware at one of the transceivers, distributed between two or more transceivers, or at a dedicated integrated circuit to which the transceivers are connected. Alternatively, the arbiter could be provided in software executing on a processor of the system at which the transceivers are located. The arbiter preferably operates at the physical layer on a per-packet or per-burst basis, but could alternatively operate at the data link layer (for example, if the arbiter is embodied in software). Transceivers 101 and 102 are connected to arbiter 103 by links 106 and 107, respectively, which are representative of a logical connection between transceiver and arbiter (although in the case of a hardware arbiter the links would typically be wired connections).

Figure 2:
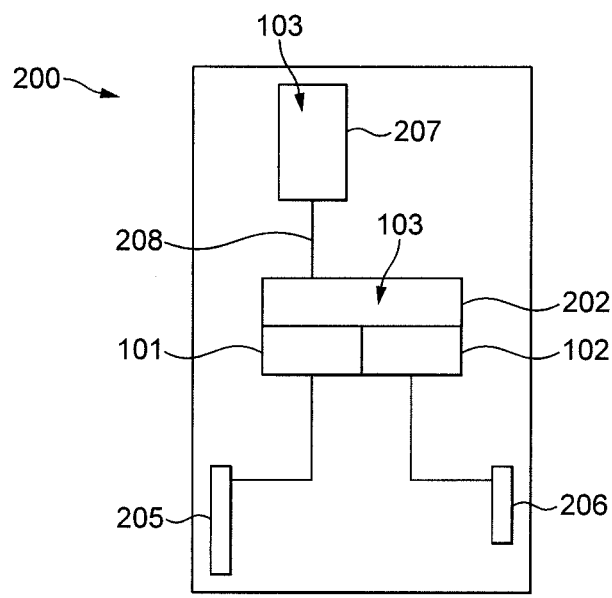
FIG. 2 is a schematic diagram of a mobile telephone configured in accordance with the present invention.

An exemplary embodiment of the present invention at a mobile telephone 200 is illustrated in FIG. 2. In the figure, transceivers 101 and 102 are provided at a common integrated circuit 202 and coupled to their respective antennas 205 and 206. The mobile telephone also includes a general purpose processor 207 connected to the transceiver IC 202 by link 208. In the example shown in FIG. 2, arbiter 103 is embodied in hardware at the transceiver IC 202 or provided as software supported at processor 207. Transceivers 101 and 102 would typically be Bluetooth and WiFi transceivers.

The arbitration scheme of the present invention will now be described with reference to FIG. 1. In this example, transceiver 102 has data to transmit and transceiver 101 is expecting to receive data, but it should be understood that the same arbitration mechanism can apply if the roles of the transceivers (and antennas) is reversed. Furthermore, it will be apparent to the skilled person that the arbitration scheme described herein can be extended to manage the transmissions of three or more collocated transceivers that have the potential to mutually interfere with one another.

Transceivers 101 and 102 are configured to send transmit requests (109/111) to arbiter 103 when that respective transceiver intends to transmit data. A transmit request includes at least a representation of the transmit power at which the respective transceiver intends to transmit the data. Transceivers 101 and 102 are also configured to send receive requests (109/111) to arbiter 103 when that respective transceiver expects to receive data. A receive request includes a measure of the expected receive quality at the respective transceiver. In this manner, arbiter 103 is informed of the communication activity of the two transceivers. Note that the transmit and receive requests need not be explicit requests transmitted to the arbiter by the transceivers; the requests could comprise the arbiter monitoring data stored at the respective transceivers in order to identify when the transceivers are intending to transmit or receive data—in this embodiment the transceivers do not transmit requests to the arbiter as such but instead maintain data indicating their intended activity.

In preferred embodiments of the present invention transmit and receive requests to the arbiter further include an indication of the frequency or channel at which respective transceivers intend to transmit and receive. This is because the receive quality experienced at transceiver 101 operating at a particular receive frequency/channel due to transmissions by transceiver 102 operating at a particular transmit frequency/channel depends on the relative spacing of those transmit and receive frequencies/channels. Transmit and receive frequencies/channels that are closer together will generally cause the receiving transceiver to experience greater interference and hence a lower receive quality.

A particular example of the operation of arbiter 103 will now be described. When transceiver 102 has data to transmit, transceiver 102 indicates to arbiter 103 by means of a transmit request 111 that it wishes to transmit data within a particular time window. Transmit request 111 includes at least a representation of the transmit power at which transceiver 102 intends to transmit the data. On receiving the transmit request 111, arbiter 103 determines by means of transmit or receive requests from transceiver 101 whether transceiver 101 is also intending to perform any communication activity that is likely to overlap with the time window.

In a first scenario, transceiver 101 is intending to transmit data within the time window. In this case, one of the transceivers is prevented from transmitting data by means of an arbitration response (110/112). The arbiter determines which transceiver is prevented from transmitting data within the time window in accordance with, for example, the priorities of the transmission operations (which could be specified in the respective transmit requests), the fixed priorities of the transceivers themselves, or the order in which the transmit requests are received at the arbiter.

In a second scenario, transceiver 101 is expecting to receive data within the time window. In this case, the arbiter 103 determines a threshold transmit power below which transceiver 102 is permitted to perform the requested transmission operation and transmits these parameters to transceiver 102 in arbitration response 112. The threshold transmit power is determined in dependence on at least the expected receive quality at transceiver 101 and the intended transmit power at transceiver 102. In this manner, the arbiter indicates to transceiver 102 that transmission may only proceed if the transmit power of the transmission operation is selected so as to limit the degradation due to interference caused to the receive activity requested by transceiver 101.

The arbiter could be configured to determine the threshold transmit power of the transmit operation from a data store (not shown in the figures) comprising, for a range of receive qualities at antenna 104, the threshold transmit power from antenna 105 below which transceiver 101 can reasonable expect to successfully complete a given receive operation. The data store could comprise threshold data derived from empirical measurements or modeling of the device 100 at which the transceivers are located. For example, the data store could comprise data representing measurements of the interference or receive quality at transceiver 101 due to transmissions from transceiver 102, with the data store expressing the interference level for various combinations of transmission frequency and the frequency at which transceiver 101 is tuned to. In this manner, the data store can express the interference coupling for a given antenna configuration of device 100. Note that a threshold transmit power could equally be expressed or stored as a maximum transmit power from antenna 105, above which transceiver 102 is not permitted to transmit.

Alternatively or additionally, the data store could comprise one or more equations describing the variation of threshold transmit power from antenna 105 with expected receive quality at transceiver 101. The equations could further depend on the frequencies at which transceiver 101 expects to receive and at which transceiver 102 intends to transmit. For example, the equations could describe the strength of coupling between antennas 101 and 102, with the predicted interference level or receive quality at transceiver 101 being scaled by the difference in frequency between the transmit frequency at transceiver 102 and the receive frequency at transceiver 101.

It is advantageous if the data store (its threshold data or the parameters of the equations) are configured to be dynamically updated in dependence on the performance of the transceivers 101 and 102. For example, the arbiter could be configured to modify the data at the data store in dependence on a measure of the receive quality for a given frequency/channel when the transmitter is transmitting at a given frequency/channel and power. Thus, if the receive quality when the transmitter is allowed to transmit is lower than the arbiter expected using the information stored at the data store, the arbiter can modify the information at the data store such that next time the same or similar combination of transmit frequency and power with receive frequency presents to the arbiter, the arbiter further restricts the transmit power or other parameters of the transmission operation. It is therefore advantageous to have transceiver 101 report the receive quality of reception events to the arbiter in subsequent requests or by any other means.

For devices in which transceiver 101 is also capable of transmission, the data store preferably comprises equivalent threshold information describing the maximum permitted transmit power from antenna 104 for a range of expected receive qualities at transceiver 102.

The present arbitration scheme can also be used to ensure that the power of transmissions from transceiver 102 does not drop below predetermined minimum levels (which could be stored on a per frequency/channel basis). The predetermined minimum levels could be selected so as to avoid transceiver 102 transmitting at powers below which it is highly unlikely that a receiver is going to be able to receive the transmissions. If the arbiter 103 determines that the threshold transmit power is below a predetermined minimum transmit value, the arbiter is preferably configured to indicate to transceiver 102 in arbitration response 107 that it is not permitted to transmit. Alternatively, the decision whether to transmit could be determined by the transceiver: if the threshold transmit power is below a predetermined minimum transmit value, transceiver 102 could abandon or postpone its transmission operation.

In preferred embodiments of the present invention, transceiver 102 is configured to receive an indication of the link margin from the remote device with which it is communicating. The link margin is preferably expressed as a signal margin above the noise floor but this could potentially be expressed in any other way, such as a receive signal strength or power. The link margin provides to the transceiver 102 a measure of the signal-to-noise ratio of transmissions received at the remote device from the transceiver and provides the preferred means by which a minimum transmit power level can be estimated (preferably on a per channel/frequency basis).

The transceiver is preferably configured to provide the link margin to the arbiter in its transmit request. This allows the arbiter to estimate the minimum transmit power at which transceiver 102 can transmit and expect the remote device to successfully receive its transmissions. Such estimates could be based on data (such as algorithms or equations) stored at the data store accessible to the arbiter. For example, if the link margin is large, the transceiver can afford to substantially drop its transmit power; if the link margin is small, the transceiver is already close to the transmit power at which the remote device will struggle to receive its transmissions and therefore the transceiver cannot significantly drop its transmit power.

In these preferred embodiments, the arbiter compares the minimum transmit power it derives from the link margin reported by transceiver 102 with the estimated threshold transmit power below which the transceiver must operate if it is to avoid interfering with reception operations at transceiver 101: if the threshold transmit power is below the minimum transmit power then the arbiter signals to transceiver 102 in its arbitration response 112 that it is not permitted to perform its requested transmission operation. Alternatively, transceiver 102 could be configured to estimate its minimum transmit power from the link margin (e.g. if the transceiver does not report the link margin to the arbiter) and itself determine whether to perform its transmission operation in dependence on this minimum transmit power and the threshold transmit power received from the arbiter.

In embodiments in which the transceiver determines whether a transmission operation should be abandoned or postponed in dependence on the arbitration response from the arbiter, the transceiver need not provide the link margin to the arbiter and can itself use the link margin to determine (in the manner described for the arbiter) whether a transmission operation should be abandoned or postponed.

If the arbiter determines that the threshold transmit power is at least approximately equal to the intended transmit power indicated in transmit request 111, the arbiter could be configured to not send a response to transceiver 102, with the transceiver being configured to perform communication operations in the manner it intends to unless it receives a response from the arbiter indicating that it is not to transmit or it can transmit but only within up to a specified threshold transmit power.

The receive quality could be any suitable measure of receive quality, including receive signal strength, receive power, noise level, error rate (e.g. a bit error rate, BER), and number of packets dropped. A transceiver is preferably configured to estimate its receive quality in dependence on measurements of the receive quality of previous reception operations. This is particularly important in the case of mobile devices since it allows the transceiver to maintain an accurate picture of the likely receive quality as, for example, the distance from the receiving transceiver to the remote transmitter varies. The transceiver could further maintain measurements of the receive quality of previous reception operations for each frequency/channel or groups of frequencies/channels since different frequencies/channels can experience different signal conditions.

The time window for which the arbiter performs its estimation of threshold transmit power could be a single packet, a burst of packets, or a time period of a predetermined length. Transceivers 101 and 102 could be asynchronous and send receive/transmit requests to the arbiter as and when those transceivers wish to receive/send data. Alternatively, transceiver 101 and 102 could be synchronised to send receive/transmit requests in respect of common time windows of predetermined length.

Since a transceiver may not always know when it is likely to receive data, the arbiter could be configured to receive transmit requests from a transceiver with receive requests involving the arbiter in response snooping data held at the other transceiver that identifies upcoming reception operations (or simply the frequency/channel at which the transceiver 101 is currently operating).

In preferred embodiments of the present invention, the arbiter can be configured to constrain further transmit parameters of a collocated transceiver. This can be performed in the manner described above in dependence on further information held at the data store accessible to the arbiter. For example, if the transceiver has multiple antennas, the arbiter is preferably configured to indicate in its arbitration response how the transceiver is to distribute its transmit power between its antennas (or which antennas it should use and/or which transmission mode). This decision could be determined in dependence on, for example, information held at the data store identifying how interference at the receiving transceiver depends on the choice of transmitting antenna. For instance, if a MIMO WiFi transceiver has two antennas and the transmissions from one of the antennas couples more strongly than the other to the receive antenna of a Bluetooth transceiver, then the arbiter could indicate in arbitration response to the WiFi transceiver that it is only permitted to transmit using the antenna that less strongly couples to the Bluetooth antenna when the Bluetooth antenna is expecting to receive data.

Similarly, if one of the transceivers has an antenna system with which it can transmit a beam in a particular direction, the arbiter could indicate in its arbitration response the direction in which the transceiver is to direct its transmissions, or at least a direction in which the transceiver is not to direct its transmissions. Since the antenna positions at the device are likely to be fixed, it is straightforward for the arbiter to know which direction is to be avoided. It could be left up to the transmitting transceiver to determine whether or not it should perform its transmission operation given the constraint on the direction in which it is permitted to transmit.

The arbiter could further indicate any other constraints in its arbitration response to a transceiver wishing to perform a transmission operation, including choice of modulation scheme, absolute or relative time windows within which the transceiver is permitted to transmit or within which the transceiver is not permitted to transmit. Any combination of the constraints described herein could be combined in an arbitration response. For example, an arbiter in a device having a MIMO WiFi transceiver with two antennas and a Bluetooth transceiver could indicate in an arbitration response to the WiFi transceiver (following a transmit request from the WiFi transceiver) that the transceiver is not permitted to transmit within a particular time window when the Bluetooth transceiver is scheduled to transmit, but outside of that time window the WiFi transceiver can transmit providing its transmit power does not exceed 2 mW and only the first antenna is used.

The present invention recognises that, at any given point in time, the likelihood or severity of interference at the physical layer is a function of the relative characteristics of the coexisting communication systems at that time—and in particular, the relative transmit and receive power levels. Thus, transmission of data by one transceiver does not necessarily mean that reception of data by a collocated transceiver is impossible and both transceivers can often be permitted to simultaneously communicate provided that the transmit parameters of the transmitting receiver are constrained such that interference at the receiving transceiver due to the transmissions of the transmitting transceiver is maintained below a predetermined level.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication device having collocated transceivers and operable to communicate with a remote device having a link margin, the communication device comprising:
   a receiver of a first transceiver of the collocated transceivers operable to receive radio transmissions over one or more channels according to a first communication protocol;
   a transmitter of a second transceiver of the collocated transceivers operable to transmit radio transmissions over the one or more channels according to a second communication protocol; and
   an arbiter operably coupled to the receiver and the transmitter;
   wherein radio transmissions from the transmitter are capable of interfering with the reception of radio transmissions by the receiver, and the arbiter is configured to:
      receive from the transmitter an indication of a first transmit operation intended for performance during a first time period, including a representation of the intended transmit power and an indication of the link margin of the remote device;
      determine whether the receiver intends to perform a communication operation during the first time period;
      if the receiver intends to perform a first receive operation during the first time period, access an indication of receive quality determined by the receiver;
      determine threshold transmit characteristics, in dependence on the representation of the intended transmit power, the indication of the link margin of the remote device, and the receive quality, the threshold transmit characteristics including
         a representation of a maximum transmit power at which the transmitter is permitted to perform the first transmit operation, and
         a representation of a minimum transmit power at which the transmitter is permitted to perform the first transmit operation to ensure reception at the remote device; and cause the transmitter to proceed with the first transmit operation according to the threshold transmit characteristics.

2. A communication device as claimed in claim 1, wherein the intended transmit characteristics include an indication of the one or more channels, frequency range, modulation scheme, and selection of one or more first antennas intended for the first transmit operation.

3. A communication device as claimed in claim 1, wherein the indication of receive quality is one or more of received signal strength, received power, a measure of noise level, a measure of error rate, and a number of packets dropped.

4. A communication device as claimed in claim 1, wherein the indication of receive quality represents a measure of the receive quality of one or more previous reception operations.

5. A communication device as claimed in claim 4, wherein the receive quality is an average of a predetermined number of previous reception operations.

6. A communication device as claimed in claim 4, wherein the one or more previous reception operations are reception operations performed over the same one or more channels, frequency range, modulation scheme, and selection of one or more second antennas as intended for the first receive operation.

7. A communication device as claimed in claim 1, wherein the first time period includes a single data packet, a burst of data packets, or a predetermined length of time.

8. A communication device as claimed in claim 1, wherein the receiver is configured to notify the arbiter of the first receive operation by writing a receive indicator to a memory along with an indication of receive quality at the receiver, the arbiter being configured to access the memory in order to determine whether the receiver intends to perform a receive operation during the first time period and to receive from the receiver an indication of receive quality at the receiver.

9. A communication device as claimed in claim 1, wherein the receiver is configured to notify the arbiter of the first receive operation by sending a receive indicator to the arbiter, the receive indicator comprising an indication of receive quality at the receiver.

10. A communication device as claimed in claim 9, wherein the receive indicator includes intended receive characteristics of the first receive operation.

11. A communication device as claimed in claim 10, wherein the intended transmit characteristics comprise an indication of an intended transmit channel and intended receive characteristics comprise an indication of an intended receive channel, and the arbiter is configured to determine the threshold transmit characteristics in dependence on at least one of the intended transmit and/or receive channels.

12. A communication device as claimed in claim 11, wherein the arbiter is configured to determine the threshold transmit characteristics in dependence on a measure of the relative or absolute separation of the intended receive and transmit channel frequencies.

13. A communication device as claimed in claim 1, wherein the arbiter is configured to determine the threshold transmit characteristics in dependence on threshold data held at a data store.

14. A communication device as claimed in claim 13, wherein the arbiter is configured to dynamically update the threshold data in dependence on the receive quality of receive operations performed by the receiver.

15. A communication device as claimed in claim 13, wherein at least some of the threshold data is determined from empirical measurements or computational modeling of receive quality at the receiver for transmit operations performed by the transmitter having a range of transmit characteristics.

16. A communication device as claimed in claim 1, wherein the transmitter is configured to send the indication of a first transmit operation to the arbiter as a transmit request comprising the intended transmit characteristics.

17. A communication device as claimed in claim 16, wherein the arbiter is configured to infer the first time period from the timing of the transmit request.

18. A communication device as claimed in claim 16, wherein the transmit request comprises information identifying the first time period.

19. A communication device as claimed in claim 16, wherein the arbiter is configured to cause the transmitter to proceed with the first transmit operation by sending to the transmitter a transmit response comprising the threshold transmit characteristics.

20. A communication device as claimed in claim 1, wherein the transmitter is further configured to receive the indication of the link margin at a remote receiver of the remote device to which the transmitter has established a communication link over which the first transmit operation is to be transmitted.

21. A communication device as claimed in claim 20, wherein the link margin is representative of the reception quality of previous transmit operations by the transmitter over the communication link.

22. A communication device as claimed in claim 20, wherein the transmitter is configured to determine whether to perform the first transmit operation in dependence on the threshold transmit characteristics and the link margin.

23. A communication device as claimed in claim 20, wherein the transmitter is configured to not perform the first transmit operation if the link margin is below a predetermined level and the maximum transmit power at which the transmitter is permitted to perform the first transmit operation is lower than the intended transmit power.

24. A communication device as claimed in claim 20, wherein the transmitter is configured to include the indication of the link margin in the intended transmit characteristics and the arbiter is configured to determine whether to perform the first transmit operation by:
   estimating the link margin at the remote receiver if the first transmit operation were performed in accordance with the threshold transmit characteristics; and
   causing the transmitter to not perform the first transmit operation if the estimated link margin is below a predetermined level.

25. A communication device as claimed in claim 1, wherein the transmitter is operable to transmit using two or more antennas and the threshold transmit characteristics include an indication of:
   the maximum transmit power permitted from each of the antennas;
   which of the antennas are permitted to be used;
   a beam direction; and
   a modulation scheme in accordance with which the first transmit operation is to be performed.

26. A communication device as claimed in claim 1, wherein on determining whether the receiver intends to perform any communication operations during the first time period, the arbiter determines that the transceiver intends to transmit during the first time period, the arbiter is configured to cause the transmitter to not perform the first transmit operation.

27. A communication device as claimed in claim 1, wherein the transmitter and receiver are provided at a common integrated circuit die.

28. A communication device as claimed in claim 27, wherein the arbiter is provided at the common integrated circuit die.

29. A communication device as claimed in claim 1, wherein the arbiter operates at physical layer.

30. A communication device as claimed in claim 1, wherein the arbiter comprises software executing at a processor of the communication device and operates at data link layer.

31. A communication device as claimed in claim 1, wherein the first communication protocol and the second communication protocol are one of Bluetooth and an IEEE 802.11 protocol.

32. A method for managing radio transmissions from a transmitter in a first transceiver, to a remote device having a link margin, the radio transmissions being capable of causing interference at a receiver of a second transceiver collocated with the first transceiver, the method comprising:
   receiving, from the transmitter, an indication of a first transmit operation intended for performance during a first time period, including a representation of the intended transmit power and an indication of the link margin of the remote device;
   determining, at an arbiter, whether the receiver intends to perform a communication operation during the first time period;
   if the receiver intends to perform a first receive operation during the first time period, accessing an indication of receive quality determined by the receiver;
   determining, at the arbiter, threshold transmit characteristics, in dependence on the representation of the intended transmit power, the indication of the link margin of the remote device, and the receive quality, the threshold transmit characteristics including
      a representation of a maximum transmit power at which the transmitter is permitted to perform the first transmit operation, and
      a representation of a minimum transmit power at which the transmitter is permitted to perform the first transmit operation to ensure reception at the remote device; and
   causing the transmitter to proceed with the first transmit operation according to the threshold transmit characteristics.

33. An integrated circuit comprising:
   a receiver in a first transceiver for receiving according to a first radio communication protocol;
   a transmitter in a second transceiver for transmitting according to a second radio communication protocol to a remote device, the second transceiver being collocated with the first transceiver; and
   an arbiter operably coupled to the receiver and transmitter;
   wherein radio communications according to the first radio communication protocol are capable of interfering with communications according to the second radio communication protocol, and the arbiter is configured to:
      receive from the transmitter an indication of a first transmit operation intended for performance during a first time period, including a representation of the intended transmit power and an indication of a link margin of the remote device;
      determine whether the receiver intends to perform a communication operation during the first time period;
      if the receiver intends to perform a first receive operation during the first time period, accessing an indication of receive quality determined by the receiver;
      determine threshold transmit characteristics, in dependence on the representation of the intended transmit power, the indication of the link margin of the remote device, and the receive quality, the threshold transmit characteristics including
         a representation of a maximum transmit power at which the transmitter is permitted to perform the first transmit operation and
         a representation of a minimum transmit power at which the transmitter is permitted to perform the first transmit operation to ensure reception at the remote device; and
      cause the transmitter to proceed with the first transmit operation according to the threshold transmit characteristics.

34. The communication device of claim 31, wherein the first transceiver comprises a Multiple In Multiple Out transceiver having two or more antennas and the second transceiver comprises a Bluetooth transceiver.

* * * * *